US008448093B2

(12) United States Patent
Chen et al.

(10) Patent No.: US 8,448,093 B2
(45) Date of Patent: May 21, 2013

(54) HIERARCHICAL ORGANIZATION CHART FOR MOBILE APPLICATIONS

(75) Inventors: Chun-Yi Chen, Belmont, CA (US); Brent-Kaan William White, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 137 days.

(21) Appl. No.: 12/842,451

(22) Filed: Jul. 23, 2010

(65) Prior Publication Data

US 2012/0023455 A1    Jan. 26, 2012

(51) Int. Cl.
*G06F 3/048*    (2006.01)

(52) U.S. Cl.
USPC ........................................................ 715/853

(58) Field of Classification Search
USPC ........................................................ 715/853
See application file for complete search history.

(56) References Cited

U.S. PATENT DOCUMENTS

| 5,829,003 | A | 10/1998 | Okura |
| 6,812,941 | B1* | 11/2004 | Brown et al. ................. 715/854 |
| 6,990,495 | B1 | 1/2006 | Grason et al. |
| 7,334,197 | B2* | 2/2008 | Robertson et al. ............ 715/853 |
| 7,539,676 | B2 | 5/2009 | Aravamudan et al. |
| 7,814,427 | B2* | 10/2010 | Cook et al. .................... 715/763 |
| 7,979,808 | B2* | 7/2011 | Stiso .............................. 715/853 |
| 2003/0216957 | A1* | 11/2003 | Florence et al. ................. 705/11 |
| 2005/0050477 | A1* | 3/2005 | Robertson et al. ............ 715/853 |
| 2006/0150169 | A1* | 7/2006 | Cook et al. .................... 717/156 |
| 2007/0162859 | A1* | 7/2007 | Yakowenko et al. .......... 715/733 |
| 2007/0226030 | A1 | 9/2007 | Morinville |
| 2007/0276846 | A1 | 11/2007 | Ramanathan et al. |
| 2008/0091441 | A1* | 4/2008 | Flammer et al. .................. 705/1 |
| 2009/0006427 | A1 | 1/2009 | Veeraraghavan et al. |
| 2009/0172602 | A1* | 7/2009 | Chusing et al. ............... 715/853 |
| 2011/0055755 | A1* | 3/2011 | Chen et al. .................... 715/810 |
| 2011/0055771 | A1* | 3/2011 | Chen et al. .................... 715/854 |

FOREIGN PATENT DOCUMENTS

| JP | 2002073912 A | 3/2002 |
| TW | 0234090 B | 6/2005 |
| WO | 2007108542 A1 | 9/2007 |

OTHER PUBLICATIONS

"Viewing the Hierarchical Organizational Chart"; https://performancemanager.successfactors.eu/doc/roboHelp/04-About_Your_Worksessions_and_Preferences/ph_profile_og111.htm; Jan. 19, 2010.

* cited by examiner

*Primary Examiner* — William Bashore
*Assistant Examiner* — Henry Orr
(74) *Attorney, Agent, or Firm* — Miles & Stockbridge P.C.

(57) ABSTRACT

According to one embodiment, a computer-implemented method for creating and displaying a hierarchical organization chart in a mobile application is provided. The method includes obtaining information from a database. The information represents a first node, second node, and, optionally, at least one third node. The nodes are related to each other according to a hierarchy. The method also includes displaying the information representing the first, second, and third nodes, if any, in a graphical user interface of a mobile device. The graphical user interface may include, for example, a three-level row-based chart. The information representing the first node is displayed in a first level of the chart, the information representing the second node is displayed in a second level of the chart, and the information representing the at least one third node is displayed in a third level of the chart.

17 Claims, 7 Drawing Sheets

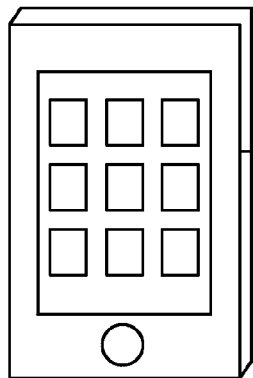
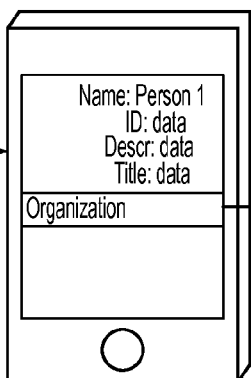
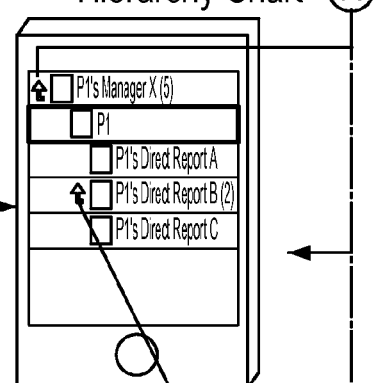
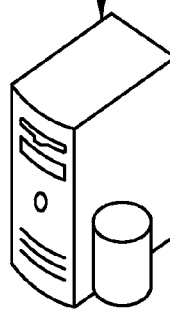
Fig. 1A

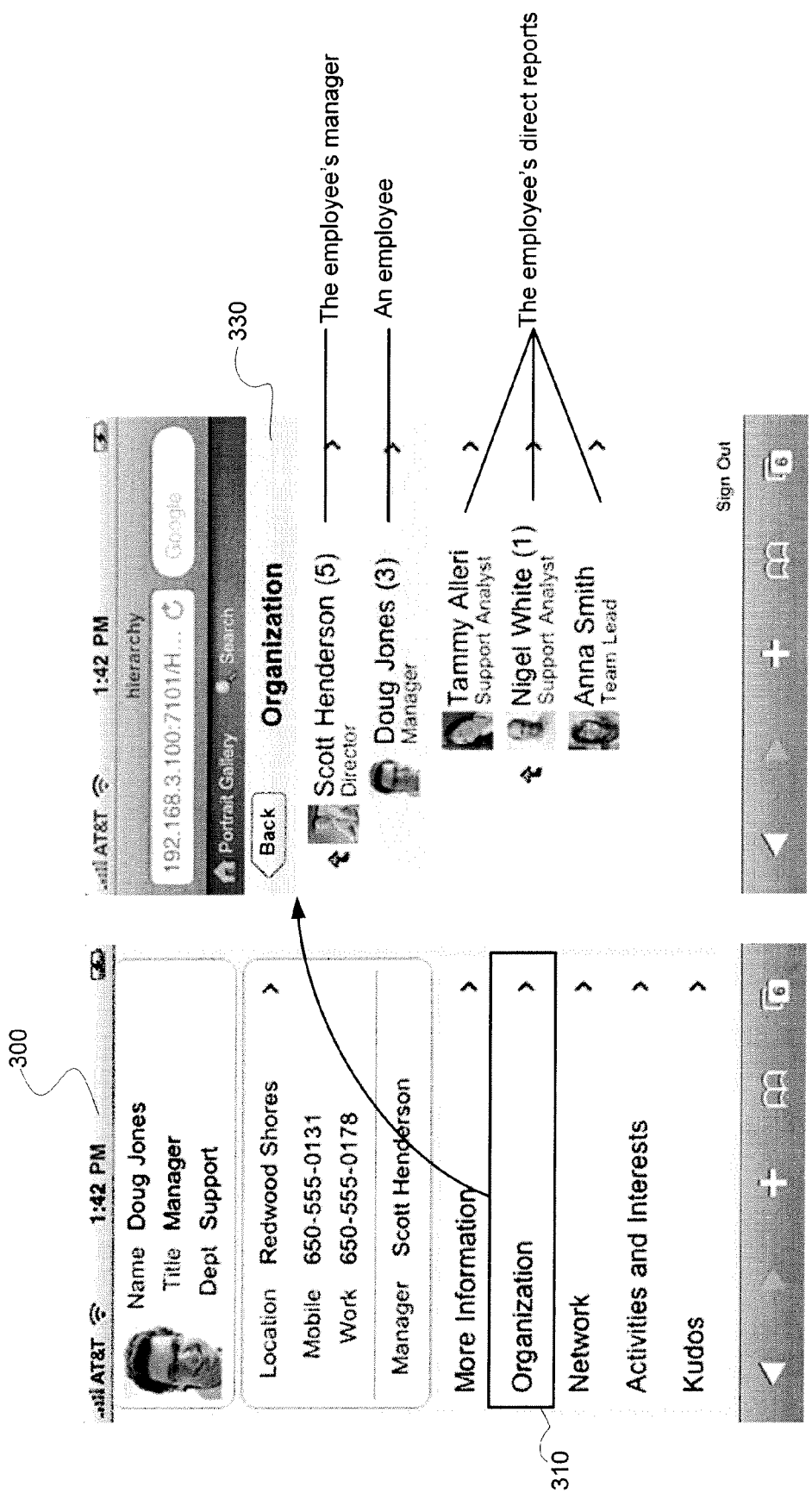

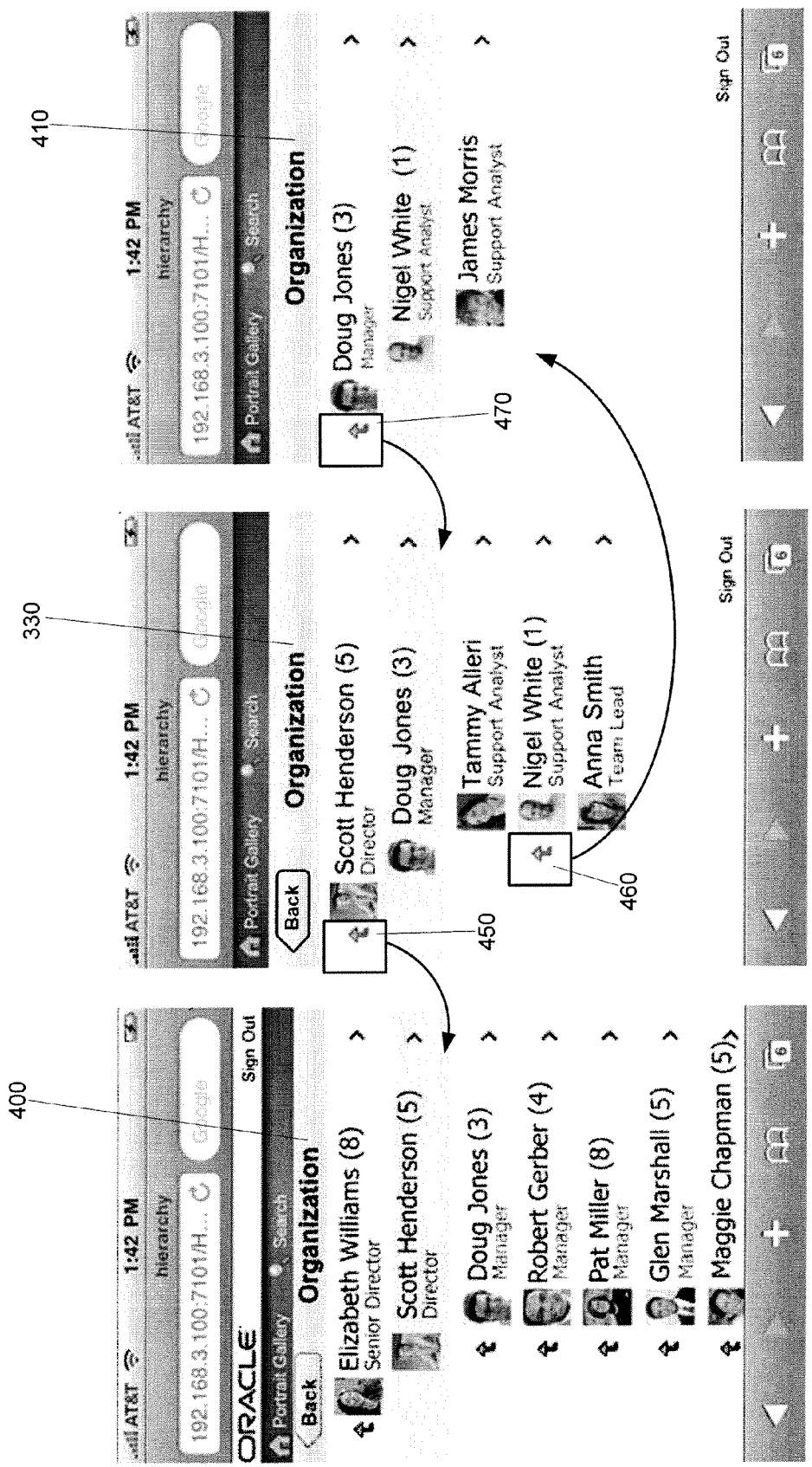

HIERARCHICAL ORGANIZATION CHART FOR MOBILE APPLICATIONS

FIELD

Embodiments of the invention generally relate to computer and information systems that provide a user interface for electronic devices, such as mobile communications devices. Some embodiments include techniques for providing a user interface representing hierarchy information in a mobile application of a mobile device.

BACKGROUND INFORMATION

All organizations and companies store information and data related to their business, such as personnel data, operational costs, customer information, and the like, to facilitate their interactions with other companies, customers and employees. Many tools have been developed to make collecting data easier, faster, and more convenient than ever before.

In order to be meaningful and most useful, data should be logically organized and stored. For example, computers often rely on data structures to store data in predefined fields. For large amounts of data, databases can be used to store and organize structured collections of data and/or records in accordance with predefined rules or database models.

Relationship models, hierarchy models, and network models, are common models for use in representing relationships among entities of information stored in databases. Typically, a database relies on database software to organize and manage data or entities of information. For example, database software organizes and stores data and records using various types of database models.

One mechanism for displaying data and allowing users to manipulate the data is a graphical user interface. User interfaces (UIs) provide a mechanism by which users can interact with a machine, device, or system. A user interface includes physical hardware and software components that together provide a means of inputting information to allow a user to manipulate a system, and provide a means of outputting information to allow the system to indicate the effects of the user's manipulation. A graphical user interface (GUI) is a type of user interface that utilize images and graphics, in addition to text, to facilitate interaction between a user and the system. For example, a GUI may offer graphical icons, windows, and/or buttons to represent information and actions available to the user.

Examples of systems that may incorporate a graphical user interface include, but are not limited to, computers or computing systems, communications devices including mobile phones, music and media players, gaming systems, navigation systems, appliances, and many other devices and machines. User interfaces are generally intended to make a user's interaction with these systems easier and more productive. Therefore, the GUIs discussed above provide a helpful way for displaying data, such as that stored in a database, and showing the relationships thereof to users.

SUMMARY

According to one embodiment, a computer-implemented method for creating and displaying a hierarchical organization chart in a mobile application is provided. The method includes obtaining information from a database. The information represents a first node, second node, and, optionally, at least one third node. The nodes are related to each other according to a hierarchy. The method also includes displaying the information representing the first, second, and the third nodes, if any, in a graphical user interface of a mobile device. The graphical user interface includes a multi-level row-based chart. In one embodiment, the multi-level row-based chart comprises three levels. The information representing the first node is displayed in a first level of the chart, the information representing the second node is displayed in a second level of the chart, and the information representing the at least one third node is displayed in a third level of the chart.

BRIEF DESCRIPTION OF THE DRAWINGS

For proper understanding of the invention, reference should be made to the accompanying drawings, wherein:

FIGS. 1A and 1B illustrates a diagram of a system according to one embodiment of the invention;

FIG. 3a illustrates a user interface according to one embodiment;

FIG. 3b illustrates a user interface according to another embodiment;

FIG. 4a illustrates a user interface according to another embodiment;

FIG. 4b illustrates a user interface according to another embodiment;

FIG. 4c illustrates a user interface according to another embodiment;

DETAILED DESCRIPTION

Embodiments of the invention provide techniques for displaying hierarchy information on a graphical user interface of a mobile device. The hierarchy information may include, for example, the management hierarchy of an organization or company. To maximize the use of the limited screen area of the mobile device, according to one embodiment, the hierarchy information is displayed in a row-based chart or tree structure. Each node in the hierarchy is represented by a single row, and indentation levels of each row serve to visually differentiate between higher and lower level nodes in the hierarchy. A node in the hierarchy may represent an entity or individual in the hierarchy.

Figure 1B:
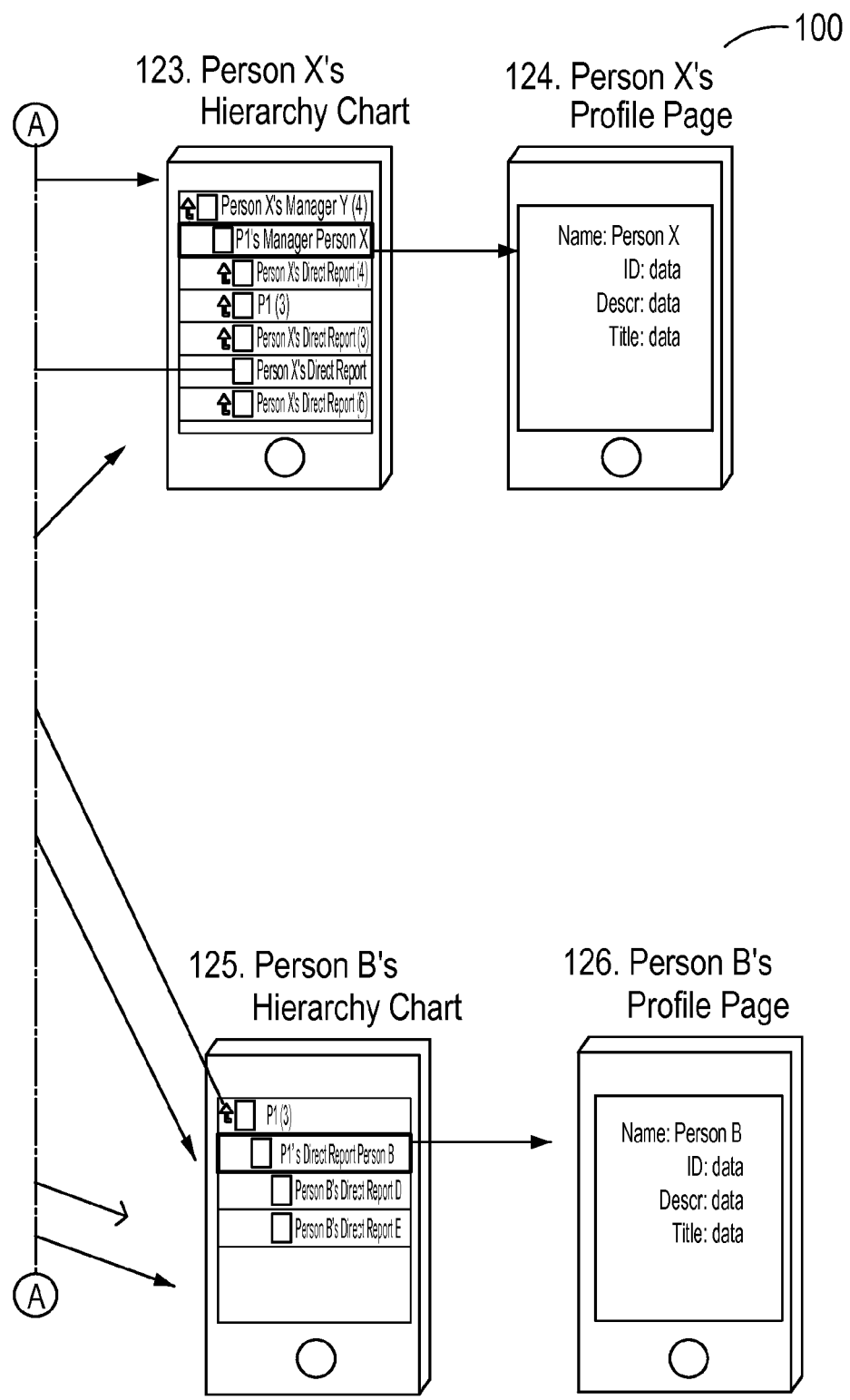

FIG. 1 illustrates an example of a system 100 that may incorporate an embodiment of the present invention. FIG. 1 is merely illustrative of one example embodiment and other variations, modifications, and alternatives are possible without departing from the scope of the invention. In one embodiment, system 100 includes one or more user devices 130. User devices 130 can be any type of mobile device, such as a mobile telephone or personal digital assistant, capable of communicating via a network or displaying and navigating web pages or other types of electronic documents. Although FIG. 1 illustrates one user device 130, any number of user devices can be supported according to certain embodiments. These user devices 130 can also be configured to run a variety of applications, including office applications, email applications, personal contact and calendar applications, database client and/or server applications, and web browser applications.

System 100 further includes a network 105 that can provide voice and/or data communications capabilities for user device 130. Network 105 can, therefore, be any type of network that can support data and/or voice communications using any protocols, including Transmission Control Protocol/Internet Protocol (TCP/IP), and the like. In one embodiment, network 105 is a mobile network such as the global system for mobile communications (GSM) network or code division multiple access (CDMA) network. Network 105 may also be a wireless network, such as a network operating under any of the IEEE 802.11 suite of protocols or WiMAX network. In other embodiments, network 105 can be the Internet, a local area network (LAN), a wide-area network, a virtual network, an intranet, an extranet, a public switched telephone network (PSTN), or an infra-red network. Network 105 can be configured to use any protocol known in the art, and can be implemented using any combination of these and/or other networks.

System 100 further includes at least one server 110 that may be configured to run an operating system and one or more applications that provide services to one or more user devices 130 and/or other devices on network 105. Server 110 may, for example, be a web server for processing requests for web pages or other electronic documents from user device 130. The web server can run a variety of server applications, including hypertext transfer protocol (HTTP) servers, file transfer protocol (FTP) servers, database servers, Java servers, and the like. In some embodiments, server 110 may be configured to serve web pages that can be operated within a web browser of the user device 130.

According to other embodiments, server 110 includes one or more file and/or application servers that include applications accessible by a client running on user devices 130 or other devices in system 100. Therefore, server 110 can include one or more general purpose computers capable of executing programs or scripts in response to user device 130 or other devices in system 100. As another example, server 110 may include a database server which can process requests from database clients running on user devices 130.

According to some embodiments, server 110 can dynamically create pages, or portions thereof, for displaying information to user device 130. The pages may be displayed as part of a graphical user interface on a display or screen of user device 130. It should be noted that the functions of server 110 can be performed by a single server or a plurality of servers, depending on the implementation.

In one embodiment of the invention, server 110 provides a hierarchy layout or chart to user device 130 for display. The hierarchy chart is optimized for display on a screen of a mobile device that has less screen area than desktop or laptop computers, for example. The hierarchy chart may be a representation of the hierarchy of any organization, such as a business, association, club, or any other organization with a hierarchical structure. The hierarchy chart may be provided from server 110 to user device 130 in response to a request from user device 130. As illustrated in FIG. 1, at 120, a user of user device 130 might open or navigate to task A in an application. When the user opens task A, user device 130 requests, via network 105, the profile page for person 1, which is associated with task A, from server 110. Server 110 provides the profile page for person 1 to user device 130, via network 105 and, at 121, the profile page is displayed in a user interface of user device 130. The profile page may include information specific to person 1, such as name, ID, description, and title.

A user may then select an organization option or icon from the user interface of user device 130, which then prompts the user device 130 to request the hierarchy layout or chart focused on person 1 from mobile network 105. At 122, user device 130 receives and displays the hierarchy chart focused on person 1 from server 110, via mobile network 105. As shown at 122, person 1's hierarchy chart includes a row displaying person 1, which is the focused row of the hierarchy chart. Person 1's hierarchy chart also includes a row that displays person 1's manager above the row displaying person 1. Further, person 1's hierarchy chart can include rows for displaying any direct reports of person 1 below the row displaying person 1.

Accordingly, embodiments of the invention provide a row-based hierarchy for displaying nodes in mobile applications. According to one embodiment, each node represents a person and includes personnel information. In one example, each person in the hierarchy takes up one row in the hierarchy chart, and the hierarchy chart includes three levels of the management chain in a hierarchical order. For instance, the three levels may include the employee that is the focused node, the employee's manager, and the employee's direct reports. Such a three level hierarchy chart reduces the complexity of the display, and is easy to understand and navigate. Additionally, the three level hierarchy chart optimizes the use of the limited screen size on a mobile user device and does not require horizontal scrolling. In some embodiments, an employee's peers are not included in the three level hierarchy chart.

Returning to FIG. 1, a user may select another node in person 1's hierarchy chart and user device 130 will send a request to mobile network 105 for a hierarchy chart that is refocused on the other selected node. In the example of FIG. 1, a user has selected to display the hierarchy chart for person X, who is the manager of person 1, and one level up in the hierarchy. Therefore, at 123, user device 130 receives and displays the hierarchy chart focused on person X from server 110, via mobile network 105. The hierarchy chart focused on person X includes the focused row of the hierarchy chart displaying person X, as well as rows below the focused row that represent person X's direct reports. One of the rows of direct reports include person 1. Person X's hierarchy chart includes a row that displays person X's manager Y above the row displaying person X. At 124, person X's profile page is displayed in the user interface of user device 130 when a user selects the already focused row representing person X from the hierarchy chart.

Similarly, at 125, when a user selects the row representing person B from person 1's hierarchy chart, user device 130 receives and displays the hierarchy chart focused on person B from server 110, via mobile network 105. Person B's hierarchy chart also includes rows representing person B's direct reports below the focused node, and a row representing person B's manager above the focused node. Again, selection of the already focused row representing person B will display person B's profile page, at 126.

In some embodiments, each row includes a name of the person represented by the row, their job title, a photograph of the person, and the number of individuals that directly report to them, if any. Additional information may be included based on the space available in the display of the graphical user interface.

Figure 2:
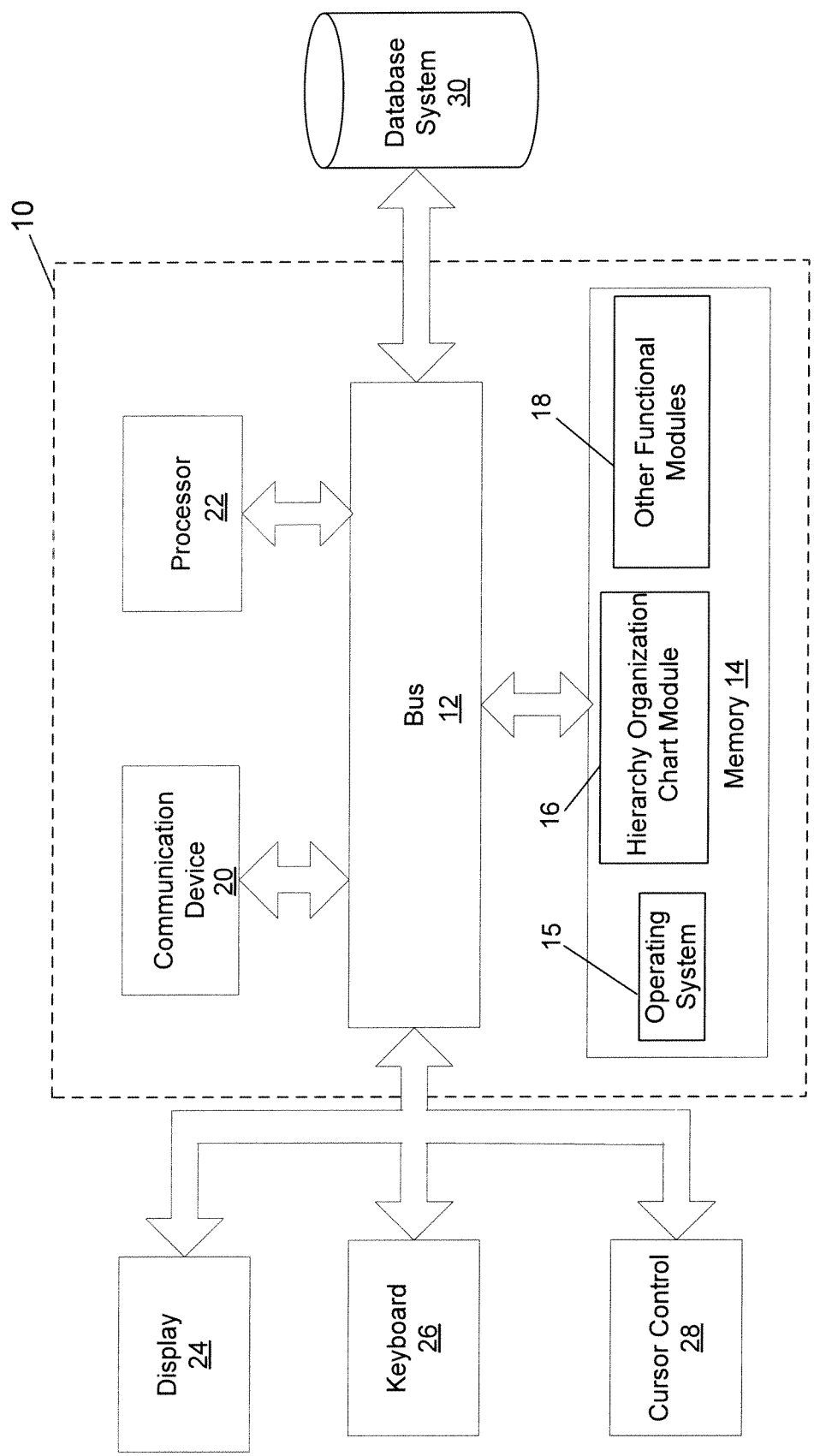
FIG. 2 illustrates a block diagram of an apparatus according to an embodiment.

FIG. 2 illustrates an apparatus 10 that may be configured to provide an organization hierarchy chart to a user interface of a device, according to one embodiment. In some embodiments, apparatus 10 is implemented as a component of a network, such as a base station system or server in a mobile communications network. For instance, apparatus 10 can be included within server 110 described above and configured to perform one or more methods of the present invention. In other embodiments, the apparatus 10 may be implemented in an electronic device, such as a mobile telephone, wireless communications device, tablet computer, gaming system, music or media player, personal digital assistant (PDA), or any other mobile device with a graphical user interface or display.

Apparatus 10 may include a communications interface 12, such as a bus or other communications mechanism, for communicating information between components of apparatus 10. Alternatively, the components of apparatus 10 may communicate directly with each other, without use of communications interface 12.

Apparatus 10 also includes at least one processor 22, coupled to communications interface 12, for receiving, managing, and/or processing network or user input or information, and for executing instructions or operations. Processor 22 may be any type of general or specific purpose processor. In one embodiment, processor 22 may be included within an application specific integrated circuit (ASIC).

Apparatus 10 further includes a memory 14 for storing information and instructions to be executed by processor 22. Memory 14 can be comprised of any combination of random access memory (RAM), read only memory (ROM), static storage such as a magnetic or optical disk, or any other type of machine or computer readable media.

Computer readable media may be any available media that can be accessed by processor 22 and could include volatile or nonvolatile media, removable or non-removable media, and communication media. Communication media may include computer program code or instructions, data structures, program modules or other data, and includes any information delivery media.

Processor 22 can further be coupled, via communications interface 12 or directly, to a graphical user interface or display 24, such as liquid crystal display (LCD) or a thin film transistor (TFT) LCD, for displaying information to a user. Any type of display capable of presenting information to the user may be used, according to certain embodiments of the invention.

Apparatus 10 further includes a communication device 20, such as a transceiver, antenna, or network interface card or other communications interface, to provide access to and facilitate communications with a network. Additionally, communication device 20 may facilitate the receipt of information from a user or the network, and the transmission of information to the user or network. As a result, a user may interface with apparatus 10 directly or remotely through the network or any other method.

In one embodiment, memory 14 stores software modules or applications that provide functionality when executed by processor 22. The modules may include an operating system 15 that provides operating system functionality for apparatus 10. The memory 14 may also store other functional modules or applications 18, such as an integrated human capital management application. Other functional modules 18 may also include text editing or messaging applications, games, web browsers, etc. Apparatus 10 may also store a hierarchy organization chart module 16 that facilitates the creation and display of a hierarchy chart on the user interface of the device.

Processor 22 and memory 14 may also be coupled via bus 12 to a database system 30 and, thus, may be able to access and retrieve information stored in database system 30. Although only a single database is illustrated in FIG. 2, any number of databases may be used in accordance with certain embodiments. In some embodiments, database system 30 may store network and/or user information. In one example, database system 30 is configured to store, update, and retrieve data in response to SQL-formatted commands.

Database system 30 may include a database server and any type of database, such as a relational or flat file database.

Database system 30 may store data that represents various nodes that are related to each other. Database system 30 also stores data representing the relationships between these nodes. Each of the nodes can be associated with one or more attributes. In certain embodiments, the nodes represent personnel within a company or organization. The attributes can include the name, address, salary, title, etc. of each of the personnel. Database system 30 may also store any other data required by the hierarchy organization chart module 16, or data associated with apparatus 10 and its associated modules and components.

According to one embodiment, apparatus 10 is configured to receive, via communications device 20 or other receiving device, a request for a hierarchical chart from a user device. In some embodiments, the request may include an indication of a node upon which the hierarchical chart should be focused. For example, as discussed above in reference to FIG. 1, the request may be a request for a hierarchical chart focused on person 1.

When such a request is received from a user device, processor 22 is configured to retrieve information regarding the node, the node's subordinates, and the node's superior from database system 30. Processor 22 is also configured to retrieve the stored data representing the relationships between these nodes from the database. According to one example, processor 22 processes the information regarding these nodes and their relationships, generates a hierarchical chart for display on a user device, and forwards the hierarchical chart to the user device.

In some embodiments, the display of the user device is a touchscreen display that allows a user to interact directly with what is presented on the display by using their finger, hand, stylus, or another passive object. However, in other embodiments, the user device display may be a standard display, such as an LCD, that can be interacted with via a keyboard 26 or cursor control device 28, such as a computer mouse or touchpad. When the user device receives the hierarchical chart from apparatus 10, the user device is configured to display the hierarchical chart in a user interface of its display.

FIG. 3a illustrates an example profile page 300 of a person or employee as displayed in a user interface of a mobile device, according to one embodiment. In this example, the profile page 300 may include information regarding the person, such as name, title, department, location, telephone numbers, and manager. Additionally, profile page 300 may include a list of menu items or navigation icons. According to one embodiment, as shown in FIG. 3a, selection of the "organization" menu item 310 will result in the display of the hierarchical organization chart 330 illustrated in FIG. 3b. As shown in the example of FIG. 3b, the focused or center row of the hierarchical organization chart 330 represents the employee from whose profile page the "organization" menu item was selected. Organization chart 330 also includes a row, above the row representing the focused node, that represents the manager of the focused node. Organization chart 330 can also include one or more rows, below the row representing the focused node, that represent direct reports of the focused node. In some embodiments, each row may include the name of the node, their photograph, their title, and the number of direct reports they have shown in parenthesis, if any.

Therefore, embodiments of the invention provide a three-level hierarchical, ordered chart in one view. According to certain embodiments, the three-level hierarchical chart displays three levels of the management chain of an organization in rows. One level represents an employee (i.e., the focused node), a second level represents the employee's manager, and a third level represents one or more of the employee's direct reports. In the example of FIG. 3b, "Doug Jones" is the focused node, "Scott Henderson" is the manager of "Doug Jones, and "Tammy Alleri," "Nigel White," and "Anna Smith" are direct reports of "Doug Jones." In one embodiment, the hierarchical organization chart uses indentations to visually differentiate between position levels. For example, the row representing the manager or top-most node in the organization chart would not be indented, while the row representing the employee or focused node would be indented once, and the rows representing the employee's direct reports would be indented twice. This provides an intuitive, visual representation of the hierarchical relationship between nodes in the organization chart 330.

FIGS. 4a-4c illustrate a mechanism for navigating between levels in the hierarchy, according to one embodiment. Similar to the organization chart illustrated in FIG. 3b, FIG. 4b illustrates an organization chart 330 where "Doug Jones" is the focused node. An up-arrow icon 450, 460, or 470 is used to set the focus on a new node in the hierarchy. For example, selection of up-arrow icon 450 on the row representing "Scott Henderson" will result in the display of organization chart 400, as illustrated in FIG. 4a, with "Scott Henderson" as the focused node. As a result, organization chart 400 displays the manager of "Scott Henderson" as well as his direct reports. Similarly, selection of up-arrow icon 460 in FIG. 4b results in the display of organization chart 410, as illustrated in FIG. 4c, with "Nigel White" as the focused node. Accordingly, organization chart 410 shows the direct reports and manager of "Nigel White." Selection of up-arrow 470 in FIG. 4c will return to display of organization chart 330 with "Doug Jones" as the focused node.

More specifically, according to one embodiment, selection of an up-arrow icon results in a request being sent to apparatus 10. Processor 22 recognizes the request as being for a new focused node, retrieves the relationship information for the new focused node from database system 30, and provides the information to hierarchy organization chart module 16 for the generation and rendering of an updated hierarchical chart. The updated hierarchical chart is then sent from apparatus 10 to the mobile device for display in the graphical user interface.

Thus, according to certain embodiments, the up-arrow icon is a single icon provided in the organization chart to navigate within the hierarchy. The up-arrow icon may appear to the left of nodes who are not in focus and have direct reports. The icon may be considered as an indication that the node has direct reports. The same up-arrow icon is used for setting focus to a new node in the hierarchy, navigating down, and navigating up the hierarchy. As outlined above, upon clicking the icon, the selected node moves to the focus position as the second node in the hierarchy, displaying the node's manager above, and revealing an expanded list of direct reports below the node in the focus position.

Figure 5C:
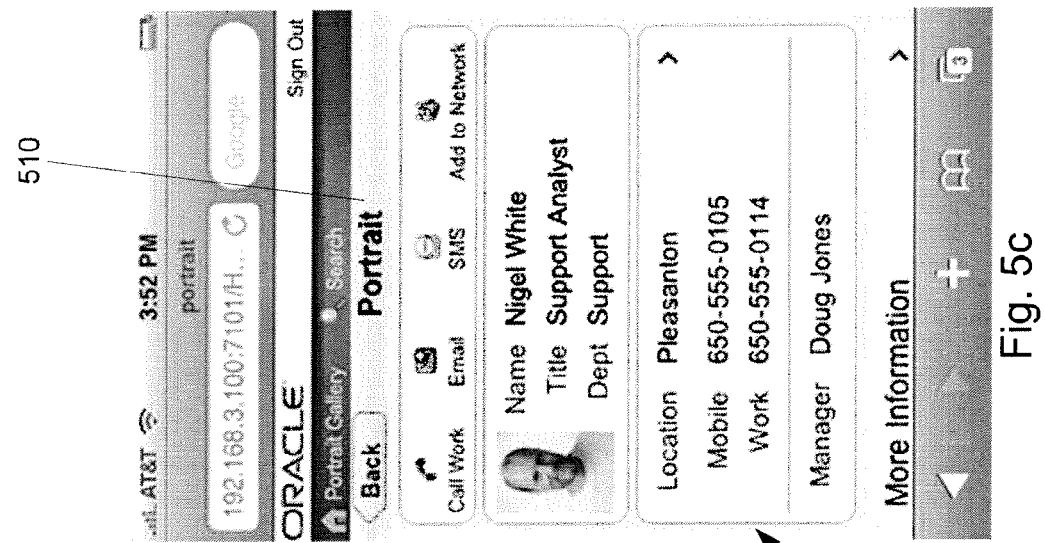
FIG. 5c illustrates a user interface according to another embodiment.
Figure 5B:
FIG. 5b illustrates a user interface according to another embodiment.
Figure 5A:
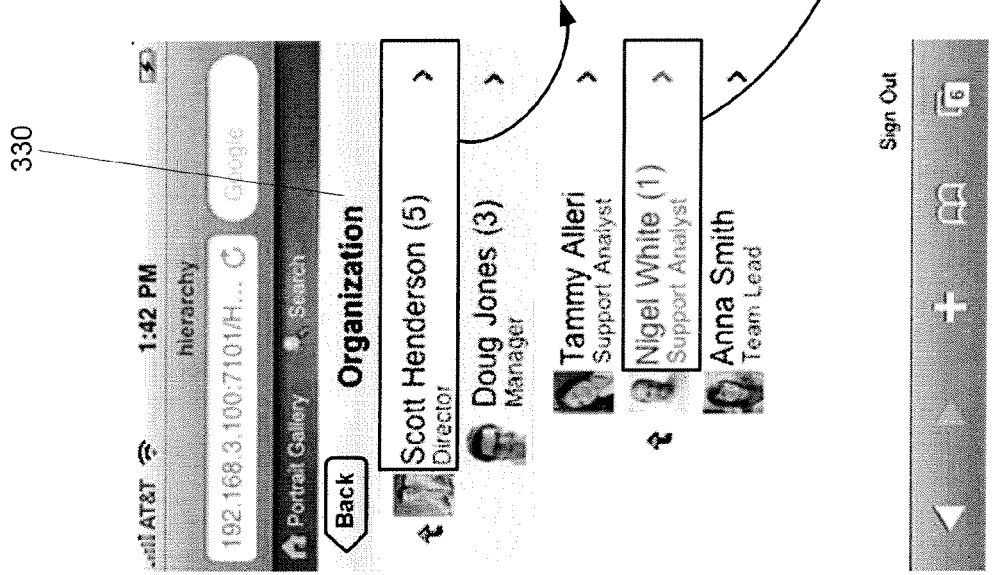
FIG. 5a illustrates a user interface according to another embodiment.

FIGS. 5a-5c illustrate the functionality for drilling into the details of any node from the hierarchical chart, according to one embodiment. FIG. 5a again illustrates an organization chart 330 that hierarchically displays three levels of the management chain. Selection of the row representing "Scott Henderson" from FIG. 5a will result in the display of the profile page 500 of "Scott Henderson," as shown in FIG. 5b. Similarly, selection of the row representing "Nigel White" from FIG. 5a will result in the display of the profile page 510 of "Nigel White," as shown in FIG. 5c. As mentioned above, a profile page may include information regarding the selected person, such as name, title, department, location, telephone numbers, and manager.

Therefore, according to one embodiment, selection of a row representing a node results in a request for the node's profile page being sent to apparatus 10. A user may select a row, for example, by clicking anywhere on the row except the up-arrow icon discussed above. Processor 22 receives and processes the request, retrieves the profile page information for the selected node from database system 30, and provides the information to hierarchy organization chart module 16 or other functional module 18 for the generation and rendering of the requested profile page. The profile page is then sent from apparatus 10 to the mobile device for display in the graphical user interface.

Figure 6:
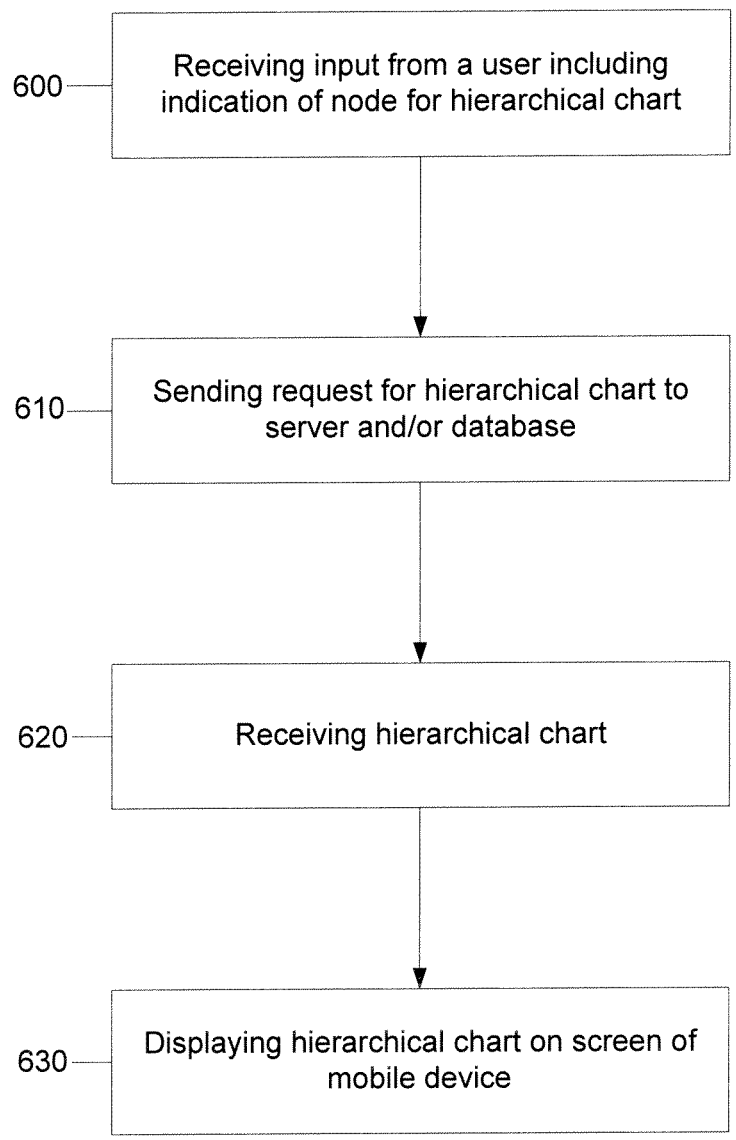
FIG. 6 illustrates a flow diagram of a method according to an embodiment.

FIG. 6 illustrates a flow diagram of a method for creating and providing a hierarchical organization chart in a user interface, according to one embodiment of the invention. In one embodiment, the functionality of the flow diagram illustrated in FIG. 6 is implemented by software stored in memory or other computer readable or tangible media, and executed by a processor. In other embodiments, the functionality may be performed by hardware (e.g., through the use of an application specific integrated circuit (ASIC), a programmable gate array (PGA), a field programmable gate array (FPGA), etc.), or any combination of hardware and software.

The method of FIG. 6 includes, at 600, receiving input from a user. The input may be the selection of a menu item or icon from an application or touchscreen of a mobile device. The input may include an indication of a node for which a hierarchical organization chart is requested. The indicated node will be the focused node of the hierarchical organization chart. In some embodiments, the node is an employee or member of an organization.

At 610, the method then includes sending a request to a server and/or database to retrieve the hierarchical organization chart for the node. The server and database may be a component of a mobile network in communication with the mobile device, or may be connected to the mobile network. At 620, the method includes receiving, at the mobile device, the requested organization chart from the server and/or database. The method further includes, at 630, displaying the organization chart in a graphical user interface of the mobile device.

Embodiments of the invention may also include a computer program embodied on a non-transitory computer readable storage medium. The computer program may include computer code or instructions that, when executed by a processor, cause the processor to execute any of the methods described herein, such as the method illustrated in FIG. 6.

It should be noted that many of the functional features described in this specification have been presented as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, causes the processor to display a hierarchical organization chart, the displaying comprising:
    obtaining information from a database, the information representing a first node, a second node, and a third node, wherein the first node, the second node, and the third node are related to each other according to a hierarchy representing a management hierarchy of an organization, and the second node is set as a focused node;
    displaying the information representing the first node, the second node, and the third node in a graphical user interface of a mobile device, wherein the graphical user interface comprises a multi-level row-based chart, the information representing the first node is displayed in a first level of the chart, the information representing the second node is displayed in a second level of the chart below the first level, and the information representing the third node is displayed in a third level of the chart below the second level;
    receiving a request to set a node different than the second node as the focused node, wherein,
        if the request sets the first node as the focused node, then the information representing the first node is displayed in the second level of the chart, the information representing the second node is displayed in the third level of the chart, and the information of the third node is not displayed, and
        if the request sets the third node as the focused node, then the information representing the third node is displayed in the second level of the chart, the information representing the second node is displayed in the first level of the chart, and the information of the first node is not displayed.

2. The computer-readable medium according to claim 1, wherein the obtaining further comprises sending a request from the mobile device to the database, and receiving a response from the database including the information representing the first node, the second node, and the third node.

3. The computer-readable medium according to claim 1, wherein the nodes represent employees of the organization.

4. The computer-readable medium according to claim 3, wherein the first node represents a manager of the second node, and the third node is a direct report of the second node.

5. The computer-readable medium according to claim 1, wherein each row of the chart comprises at least one of a name, title, photograph, and number of direct reports of the node.

6. The computer-readable medium according to claim 1, wherein indentation is used to differentiate between hierarchy levels in the chart.

7. The computer-readable medium according to claim 1, wherein an icon is associated with at least one of the first and third nodes, and further comprising:
    changing the focused node to be one of the first and third nodes when the icon associated with one of the first and third nodes is selected.

8. The computer-readable medium according to claim 1, further comprising:
    displaying a profile page of a node when the row associated with the node is selected.

9. A computer-implemented method for displaying a hierarchical organization chart in a mobile application, the method comprising:
    obtaining information from a database, the information representing a first node, second node, and a third node, wherein the nodes are related to each other according to a hierarchy representing a management hierarchy of an organization, and the second node is set as a focused node;
    displaying the information representing the first node, the second node, and the third node in a graphical user interface of a mobile device, wherein the graphical user interface comprises a multi-level row-based chart, the information representing the first node is displayed in a first level of the chart, the information representing the second node is displayed in a second level of the chart below the first level, and the information representing the third node is displayed in a third level of the chart below the second level;
    receiving a request to set a node different than the second node as the focused node, wherein,
        if the request sets the first node as the focused node, then the information representing the first node is displayed in the second level of the chart, the information representing the second node is displayed in the third level of the chart, and the information of the third node is not displayed, and
        if the request sets the third node as the focused node, then the information representing the third node is displayed in the second level of the chart, the information representing the second node is displayed in the first level of the chart, and the information of the first node is not displayed.

10. The method according to claim 9, wherein indentation is used to differentiate between hierarchy levels in the chart.

11. The method according to claim 9, wherein an icon is associated with at least one of the first and third nodes, and further comprising:
    changing the focused node to be one of the first and third nodes when the icon associated with one of the first and third nodes is selected.

12. The method according to claim 9, further comprising:
    displaying a profile page of a node when the row associated with the node is selected.

13. An apparatus, comprising:
    a processor configured to cause the apparatus to obtain information from a database, the information representing a first node, a second node, and a third node, wherein the nodes are related to each other according to a hierarchy representing a management hierarchy of an organization, and the second node is set as a focused node;

a display configured to display the information representing the first node, the second node, and the third node in a graphical user interface of a mobile device, wherein the graphical user interface comprises a multi-level row-based chart, the information representing the first node is displayed in a first level of the chart, the information representing the second node is displayed in a second level of the chart below the first level, and the information representing the third node is displayed in a third level of the chart below the second level;

a receiver configured to receive a request to set a node different than the second node as the focused node, wherein, if the request sets the first node as the focused node, then the information representing the first node is displayed in the second level of the chart, the information representing the second node is displayed in the third level of the chart, and the information of the third node is not displayed, and if the request sets the third node as the focused node, then the information representing the third node is displayed in the second level of the chart, the information representing the second node is displayed in the first level of the chart, and the information of the first node is not displayed.

14. The apparatus according to claim 13, wherein indentation is used to differentiate between hierarchy levels in the chart.

15. The apparatus according to claim 13, wherein an icon is associated with at least one of the first and third nodes, and the processor is further configured to cause the apparatus to change the focused node to be one of the first and third nodes when the icon associated with one of the first and third nodes is selected, and the display is further configured to display a new chart with the changed focused node.

16. The apparatus according to claim 13, wherein a profile page of a node is displayed when the row associated with the node is selected.

17. The apparatus according to claim 13, wherein the nodes represent employees of the organization.

\* \* \* \* \*

UNITED STATES PATENT AND TRADEMARK OFFICE
CERTIFICATE OF CORRECTION

PATENT NO. : 8,448,093 B2
APPLICATION NO. : 12/842451
DATED : May 21, 2013
INVENTOR(S) : Chen et al.

Page 1 of 1

It is certified that error appears in the above-identified patent and that said Letters Patent is hereby corrected as shown below:

In the Specification:

In column 2, line 17, delete "illustrates" and insert -- illustrate --, therefor.

In the Claims:

In column 10, line 25, in Claim 9, after "node," insert -- a --.

Signed and Sealed this
Tenth Day of September, 2013

Teresa Stanek Rea
*Acting Director of the United States Patent and Trademark Office*